United States Patent
Hammond et al.

(10) Patent No.: US 6,396,649 B1
(45) Date of Patent: *May 28, 2002

(54) OPTICAL INSTRUMENTS

(75) Inventors: Michael John Hammond, Malton; Nigel Stuart Bland, York, both of (GB)

(73) Assignee: AOTI Operating Company, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,293
(22) PCT Filed: Sep. 2, 1996
(86) PCT No.: PCT/GB96/02141
§ 371 (c)(1), (2), (4) Date: Mar. 5, 1998
(87) PCT Pub. No.: WO97/09649
PCT Pub. Date: Mar. 13, 1997

(30) Foreign Application Priority Data

Sep. 5, 1995 (GB) ............................................ 9518045

(51) Int. Cl.⁷ ................................................. G02B 7/02
(52) U.S. Cl. ...................................... 359/811; 359/819
(58) Field of Search ................................. 359/811, 819, 359/618, 629, 896, 871

(56) References Cited

U.S. PATENT DOCUMENTS

| | | | | |
|---|---|---|---|---|
| 3,596,863 A | | 8/1971 | Kaspareck .................. | 248/278 |
| 3,652,152 A | | 3/1972 | Thursby, Jr. ................ | 350/252 |
| 3,721,170 A | | 3/1973 | Johnson ..................... | 359/363 |
| 3,989,358 A | | 11/1976 | Melmoth .................... | 350/247 |
| 4,731,795 A | * | 3/1988 | Clark et al. ................. | 372/107 |
| 4,958,794 A | | 9/1990 | Brewer ....................... | 248/183 |
| 5,097,280 A | | 3/1992 | Nomura ..................... | 359/819 |
| 5,246,192 A | | 9/1993 | Aberi et al. ................ | 248/178 |
| 5,561,684 A | * | 10/1996 | Martin ....................... | 372/107 |

FOREIGN PATENT DOCUMENTS

| | | | | |
|---|---|---|---|---|
| EP | 0 505 761 | 9/1992 | ........... | G02B/21/36 |
| FR | 1 241 840 | 12/1960 | | |
| JP | 06 317 733 | 11/1992 | ........... | G02B/7/00 |
| WO | 93 06515 | 1/1993 | ........... | G02B/7/00 |

* cited by examiner

*Primary Examiner*—Ricky Mack
(74) *Attorney, Agent, or Firm*—Fulbright & Jaworski LLP

(57) ABSTRACT

The invention relates to a novel housing for an optical instrument such as a microscope. The housing is provided with a number of channel means which are positioned having regard to the optical axis of the instrument and adapted to accommodate a plurality of optical components so as to facilitate the alignment of same.

12 Claims, 4 Drawing Sheets

OPTICAL INSTRUMENTS

This application is a CPA of U.S. application Ser. No. 09/029,293.

The invention relates to optical instruments and in particular housings for optical instruments; and optical components adapted to be accommodated by said housings.

Light, isotropic or otherwise, refracted by lenses and/or reflected by mirrors is used in any number of optical devices. The conventional selection and arrangement of lenses and mirrors can be used to advantage to make, amongst other things, optical instruments that magnify images. Examples of such optical instruments include microscopes and telescopes. Both of the aforementioned instruments magnify images, but the latter is specifically adapted to view distant objects. The way light is manipulated in any number of optical instruments will not be considered herein in great detail, suffice to say that it is well known to those skilled in the art that a selected combination of lenses and mirrors can be used to advantage to alter the path of light for any selected purpose, including, but not limited to, the ones afore-described.

Common to all optical instruments is the need to provide at least one optical path, that is to say optical components must be precisely positioned with respect to each other in order to ensure that light entering the instrument travels a predefined pathway. Thus, for example, light may be made to focus at a given location before, for example, being made to travel in an alternative direction or even being split to provide for a multiplicity of beams which are similarly made to travel in a predetermined direction, where each resultant beam may be made to travel in a different direction with respect to the other resultant beams.

It will be apparent from the above that the alignment and positioning of optical components in an optical instrument is critical and/or crucial. This can be illustrated having regard to the optical schematic shown in FIG. 1.

The microscope represented in FIG. 1 comprises a fibre optic light source 1x which, briefly, emits a beam of light that is focused by refraction, via lens 2x and compensated via a compensating plate 3x. The beam of light is then used to illuminate an object and is reflected from same so as to strike a beamsplitter plate 4x and to be reflected through an angle of 90° and thus made to travel along an axis perpendicular to the optical axis and towards two cameras 5x and 6x (one with a narrow field of view and one with a wide field of view). Although in the microscope illustrated in FIG. 1 light is directed towards cameras it may be alternatively directed towards an eyepiece. In the arrangement shown, the lenses are selected so as to provide a magnified image of the object to be viewed.

The positioning of each optical component in the afore-described optical system is critical if a distortion-free image is to be achieved. For example, if lens 1 and the beamsplitter plate are misaligned then a distorted image will be obtained which will appear ultimately on the camera as an inaccurate representation of the image to be viewed.

Hitherto, the manufacture of optical instruments has involved machining a housing with a plurality of bores, each bore being machined to accommodate selected optical components. It will apparent that as the machining takes place the orientation of the housing will be sequentially changed and that the machining process will take place in intervals. This process of periodic machining, in combination with a change in housing orientation, introduces errors into the alignment of housing bores and thus into the alignment of optical components positioned within the housing. Moreover, the bores are machined so as to frictionally hold each of said components. However, it will be apparent that any machining of this type must involve a certain amount of tolerance if the optical component is in fact to pass through the bore. Thus it is possible for any optical component so positioned to be misaligned by only a small amount but by an amount sufficient to deleteriously affect the image to be achieved.

It follows from the above that the greater the number of optical components to be positioned within a housing then the greater the propensity for error and the more difficult the task. This is especially true for microscopes because they use a combination of lenses in order to provide for enhanced magnification since magnification is determined by the product of the separate magnification of each lens.

In addition to the above, the positioning and alignment of square-shaped components is rendered difficult using a conventional housing because of the differences in geometry.

It therefore follows that hitherto the manufacture of optical instruments has involved a considerable amount of time, skill and labour. Moreover the manufacturing tolerance of such instruments is in the order of tens of microns eg 20–30 microns for the type of microscope illustrated in FIG. 1.

In addition to the above, and in particular in relation to microscopes, it has always been the case that the turret for accommodating objective lenses has been mounted on the microscope so that its angle from the vertical is offset, for example, by 19°. The offset angle is designed to prevent impact between an objective lens and an object which may result because of the different working lengths of various objective lenses. The mounting of the turret at an angle is a feature that involves a considerable amount of engineering since a part of the instrument to which the turret is to be attached has also to be similarly machined so that it can accommodate a turret mounted at an angle to the vertical. Similarly, other fixtures and fittings are affected by this safety feature and thus represent a manufacturing investment in terms of labour, skill and time.

Given the above information, it is an object of the invention to provide a housing for an optical instrument which enables the assembly of the instrument in an inexpensive and a relatively easy fashion.

It is a further object of the invention to provide a housing that can be machined in a way that involves a relatively small number of machining steps and ideally a single setting for a machining tool.

It is yet a further object of the invention to provide a housing which enables an optical instrument to be assembled with relatively little skill.

It is yet a further object of the invention to provide a housing which facilitates the alignment of optical components to a common optical axis and moreover provides for the reliable and reproducible alignment of said components. It is therefore an object of the invention to provide a housing which facilitates the creation of an optical pathway.

It is another object of the invention to provide a housing which enables the registration of optical components.

It is yet a further object of the invention to provide a housing which minimises aberrations in an optical image and thus provides for a more desirable optical instrument.

It is yet a further object of the invention to provide a housing which reduces the time required for assembly and alignment of the system, which exhibits mechanical and thermal stability, which reduces the hitherto complexity of the optical instrument system and so eases manufacture and reduces the emphasis on manufacturing tolerance and which also provides for simple and easy repair and replacement of any one or more component(s) of the optical system.

It is also a further object of the invention to provide optical components adapted to fit in the housing of the invention so as to be securely and reliably held in place and so as to be easily replaceable especially for repair and maintenance.

STATEMENT OF THE INVENTION

In its broadest aspect, the invention concerns a groove or channel having at least two surfaces positioned perpendicular with respect to each other so as to provide reference surfaces against which a component can be positioned.

According to a first aspect of the invention there is therefore provided a housing for an optical instrument which housing is provided with at least one channel means having, in section, at least two sides thereof positioned at right angles with respect to each other so as to provide two reference surfaces against which optical components can be positioned.

In a preferred embodiment of the invention said channel means is provided on an inner side of said instrument and more preferably comprises a square or rectangular slot such that the bottom and one upstanding side provide said reference surfaces.

It will be understood that the channel means will be adapted to accommodate the optical components to be referenced therewith. For example, the width of the channel will be such that the largest optical component of the system will fit therein; and further the depth of the channel will be such that the largest optical component of the system will make contact with both the base of the channel and a sufficient amount of the upstanding side of the channel so as to securely locate the optical component in position. For example, in one preferred embodiment of the invention the depth of the channel will be slightly greater than the radius of any given component.

In yet a further preferred embodiment of the invention a plurality of channel means are provided within a given housing, and more preferably still, at least two of said channel means will be arranged to intersect so as to provide for a T-junction or X-junction.

It will apparent from the above that the provision of a housing including a number of locating reference channels easily and quickly enables a number of optical components to be positioned within the housing in register so as to ensure the integrity of the optical path. Moreover, it also follows, that removal and replacement of a given optical component can be undertaken in the secure knowledge that the position of alignment will not change and thus the integrity of the optical path will not be compromised. Indeed, the manufacturing tolerance of an instrument in accordance with the invention is in the order of less than 10 microns ie at least an order of magnitude greater than prior art instruments.

In yet an alternative embodiment of the invention optical components are fixedly retained within the housing by magnetic means. For example, in one embodiment of the invention a magnet is provided in said channel means. Preferably, a recess is provided within at least one of said reference surfaces which recess is sized and shaped to accommodate a magnet and ideally the magnet is flush with, or more preferably underflush with the said surface(s). Thus, ideally clearance is provided between the magnet and the optical component so as to maintain the semi-kinematic properties of the system, however it will be appreciated, that the retaining forces are maximised by minimising the distance between the component and the magnet. Where a cylindrical optical component is to be positioned a magnet may be provided in a cavity defined by a corner of the reference sides and the lower curvature of the optical component. In this embodiment, ideally the magnet is provided with an outer or working surface whose curvature matches that of the optical component or which is at least at an angle of 45°.

In an alternative embodiment of the invention mechanical means may be provided to hold each optical component in place, for example, biased screw and/or bolt means may be provided which are adapted to exert a retaining force on the optical component having a maximum upper limit such that the optical component cannot be damaged or deformed when securely held in position.

It will be apparent from the above that the invention provides for reliable and reproducible alignment of optical components. It also, advantageously, provides for the mounting of a turret without the need to provide an offset angle. In other words a turret can be mounted flat on the housing so overcoming the need to invest in expensive and time consuming machining of the housing and turret.

According to a further aspect of the invention there is provided a housing for an optical instrument which is adapted to have flatly mounted thereon a turret for accommodating objective lenses.

In a preferred embodiment of the invention said housing is provided with a flat surface that is either parallel or perpendicular with at least one channel means in accordance with the invention so that said turret is aligned with the optical axis of the housing.

In this preferred embodiment of the invention, means, ideally automatic, is provided for moving the turret and/or objective lens with respect to the object to be viewed so as to safeguard against damage to said object.

It will be apparent that the housing of the invention has a number of applications in the provision of optical instruments and although it has been, and will be, described in this document with particular reference to a microscope it is not intended that the protection should be limited thereby. Rather, it will apparent to all those skilled in the art that the housing of the invention has multiple applications in the provision of any number and nature of optical instruments where the need to provide an optical axis or pathway is crucial to the working of the instrument.

An embodiment of the invention will now be described by way of example only with reference to the following figures wherein;

DETAILED DESCRIPTION OF DRAWINGS

Figure 1:
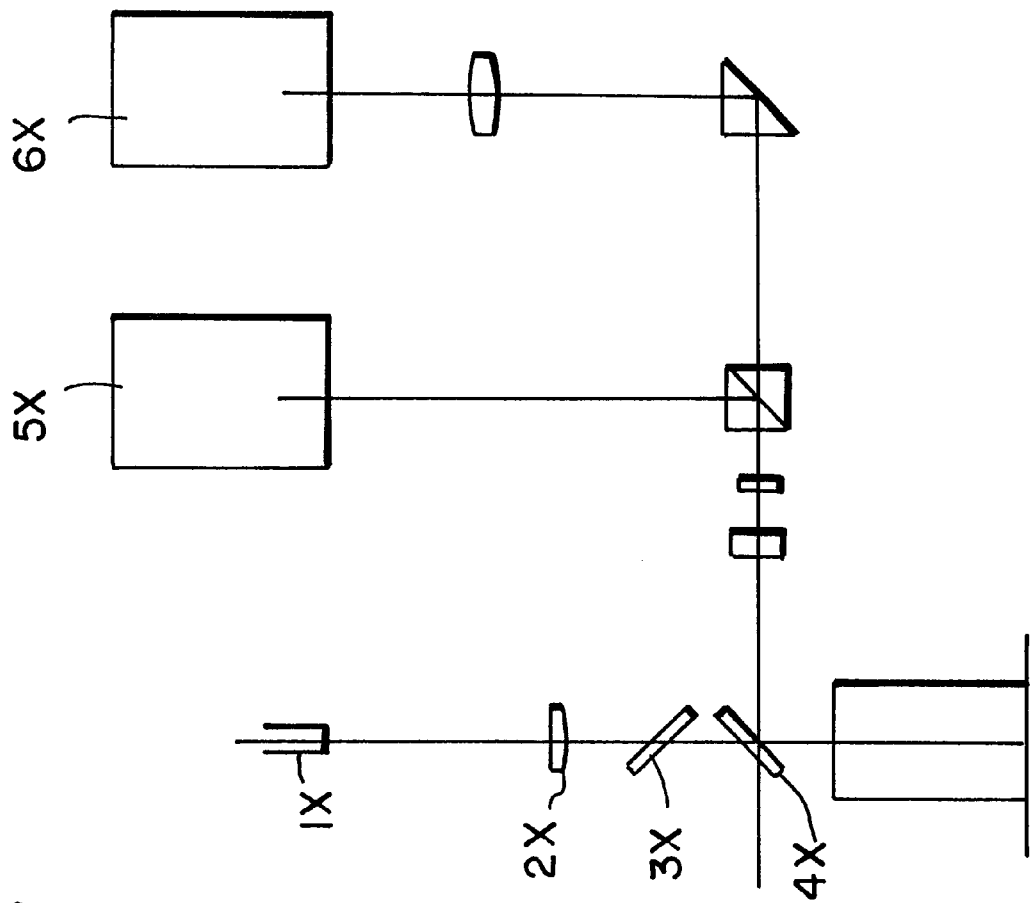
FIG. 1 represents an optical schematic of a microscope.

FIG. 1 has briefly been described in the introductory portion of this document and as mentioned it shows a single example of an arrangement of a plurality of optical components within an optical instrument with a view to producing a magnified optical image. The points to note from FIG. 1 are:

i) a large number of optical components are used, ii) the optical components are positioned with respect to each other, iii) the optical components are aligned along a common optical axis, iv) the centre or focal point of each optical component is similarly aligned along a common optical axis, v) the precise location of each component is crucial if a distortion-free image of the object to be viewed is to be achieved, thus misalignment of any one or more component will result in the production of an aberrant or diffuse image, vi) all optical instruments comprise a plurality of optical components which are selected on the basis of their function and selectively positioned with respect to each other so as to achieve a desired effect, thus FIG. 1 represents just one layout of an optical instrument which can make beneficial use of the invention described herein. Any other optical instrument can similarly make advantageous use of the invention described herein but it will be apparent to those skilled in the art that the total number of variations cannot be practically described herein nor is it necessary to describe all such variations in order that the invention can be realised rather the invention will be apparent with reference to FIGS. 2, 3 and 4.

Figure 2:
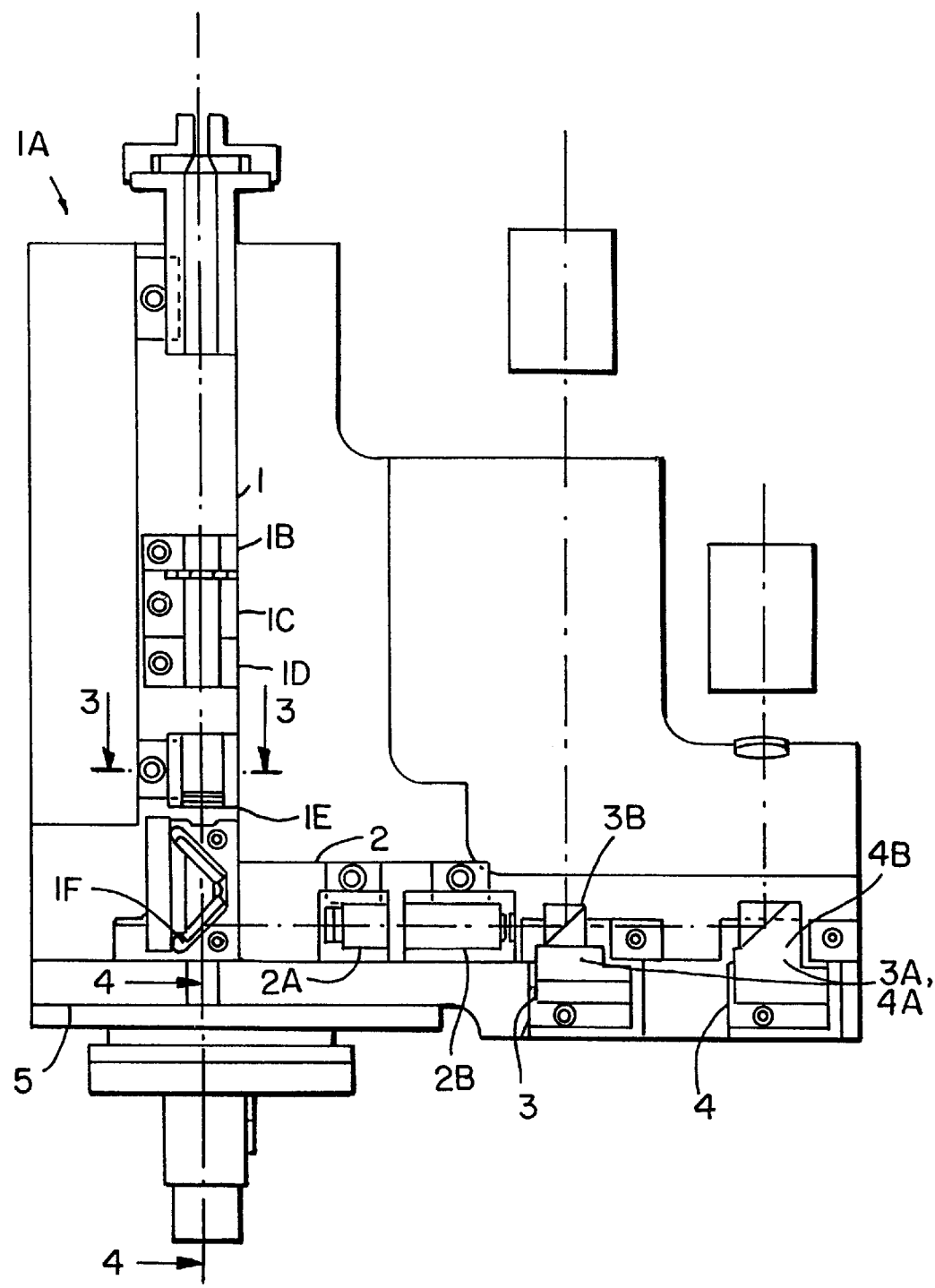
FIG. 2 represents a sectional view of a housing in accordance with the invention showing a plurality of channel means.

Referring to FIG. 2 there is shown a sectional view of a housing for an optical instrument, in this particular case a microscope. The inner surface of the housing is machined, using conventional tooling equipment, to provide a plurality of channels 1, 2, 3 and 4. The size and shape of said channels will be described hereinafter in greater detail with reference to FIG. 3. However, it is of note that each channel is sized and shaped to accommodate at least one optical component. For example, channel 1 accommodates a light source 1A, a knife edge 1B, a graticule 1C and a second knife edge 1D, and also a lens 1E. Each of the aforementioned components 1A, 1B, 1C, 1D and 1E are located within channel 1 and to the right hand side thereof such that a common optical axis is defined. Towards the left hand side of FIG. 2 the underside of the housing is provided with a flat surface 5 which is perpendicular to the longitudinal axis of channel 1 and occupies a plane that is parallel to the longitudinal axis of channel 2. This planar surface 5 is used to mount and position a turret thereagainst as will be described hereinafter in greater detail.

A second channel 2 is machined at right angles with respect to the longitudinal axis of channel 1, and further machined such that channels 1 and 2 intersect. At the point of intersection a beamsplitter plate 1F is positioned. Component 1F is positioned using reference sides provided by channel 1 and reference sides provided by channel 2 as will be apparent hereinafter.

Channel 2 further accommodates a lens 2A and a set-up lens 2B. Optical components 2A and 2B are positioned within channel 2 against reference surfaces comprising the bottom surface of the channel and one upstanding side surface of the channel and more particularly the upstanding side surface nearest to the bottom of the housing, or alternatively, nearest to planar surface 5.

Two separate channels 3 and 4 are further provided and machined so as to be perpendicular to the longitudinal axis of channel 2 but parallel to the longitudinal axis of channel 1. The reference sides of channels 3 and 4 are used to position adjustment plates 3A and 4A respectively. Adjustment plate 3A is attached to a beamsplitter 3B and adjustment plate 4A is attached to a prism 4B.

Ideally the dimensions of channels 1, 2, 3 and 4 are identical so as to ease the machining process. However, it is not essential that all the channels should be of the same size and shape, but it will be understood that the reference sides of each channel are such that a common optical axis is provided when a number of optical components are positioned within each of said channels.

Figure 3:
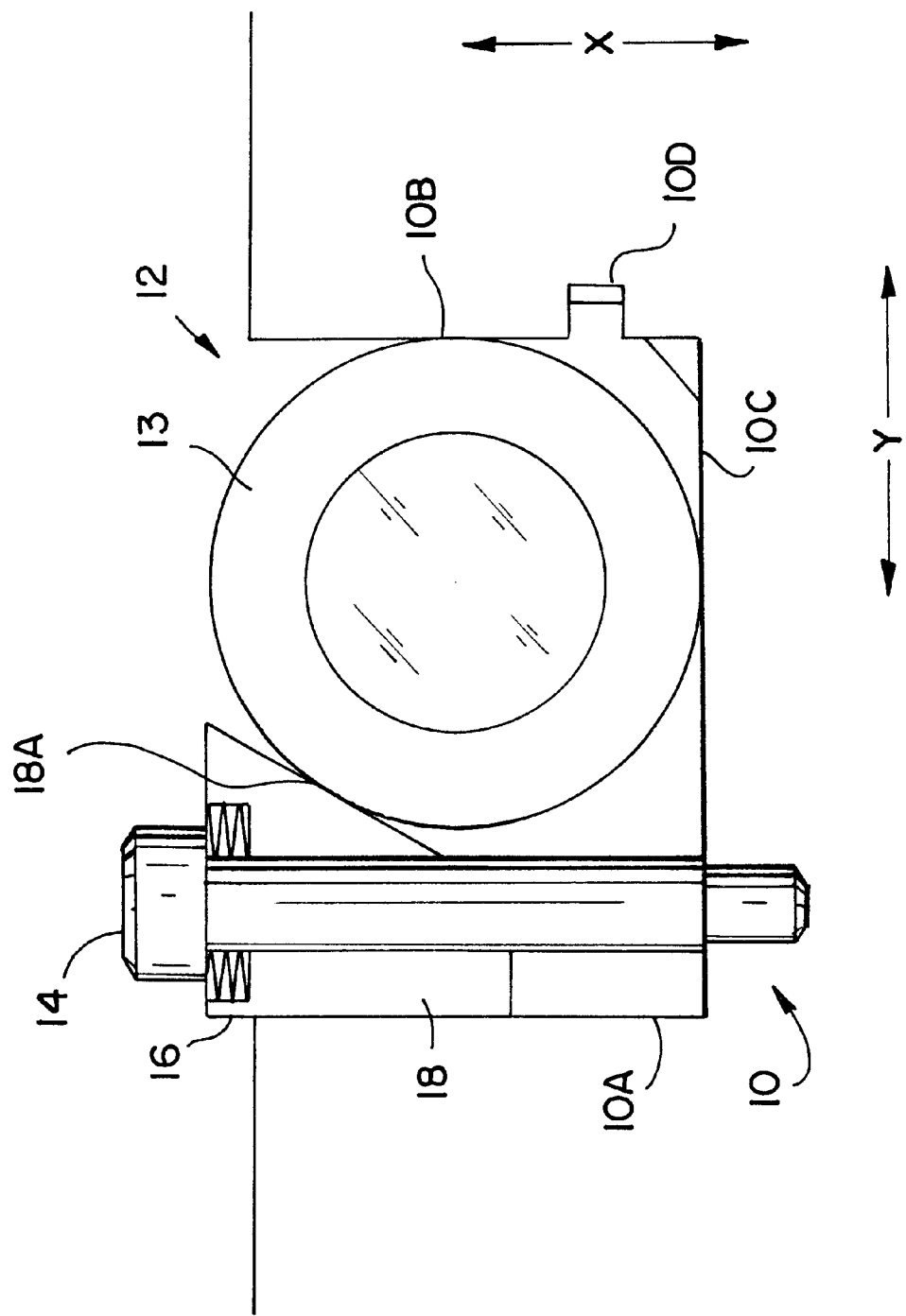
FIG. 3 represents a cross-section along the line A—A of the housing shown in FIG. 2.

Referring now to FIG. 3, there is shown a section along A—A of FIG. 2 illustrating a part of an inner side of a housing in accordance with the invention. The inner side comprises a rectangular channel 10 which is defined by two opposite upstanding sides 10A and 10B and a bottom surface 10C. It is of note that the section is square, or in other words, the lower most corners are perpendicular so as to provide an angle of substantially 90°. It is not necessary that the lower most corners are perpendicular, they may be rounded in some embodiments but nevertheless the two sides or reference surfaces, either 10A and 10C or 10B and 10C are, substantially, at right angles with respect to each other. The distance between sides 10A and 10B is calculated having regard to the largest optical component of the system. In other words, the distance is determined so that the largest component can fit within the channel. In the embodiment illustrated there is shown a sectional view of a lens component 12. The component comprises a metallic tubular mount 13 into which a lens is centrally mounted. When assembling the instrument, lens component 12 is simply located within channel 10, and to a selected side thereof depending upon the nature of the optical path, and then securely fixed in place using one of a number of alternative fixing means. In the embodiment shown in FIG. 3 a mechanical fixing means is provided. It comprises a shoulder screw 14 having resiliently mounted thereagainst, via spring 16, a clamping wedge 18. The length of screw 14 and resilience of spring 16 is calculated so that an upper maximum force is exerted by wedge surface 18A on component 12. Thus, as clamping wedge 18 and screw 14 (or alternatively a bolt) are positioned the possibility that component 12 could be damaged by excessive force on same is removed. This is important because damage to component 12 could result in deformation of the component and thus misalignment of the lens mounted therein. In other embodiments of the invention a screw bolt or bolt may be used in combination with a spacer that is a tubular member adapted to accommodate the screw bolt or bolt and limit the relative penetration of said screw bolt or bolt thus determining an upper maximum force that the screw bolt or bolt can exert upon a component to be fixedly retained within a channel.

In an alternative embodiment of the invention a magnetic means may be used to hold component 12 in position. As illustrated in FIG. 3 a recess 10D is provided in either one or both of the reference surfaces 10B or 10C and it is preferred that the recess 10D is provided below the mid line of the component to be positioned within channel 10, that is to say anywhere along the line X of surface 10B and Y of surface 10C. Recess 10D is sized and shaped to accommodate a magnet which sits within same and ideally underflush with the sides of surface 10B or 10C. Thus, the magnet is not contiguous with the component positioned within channel 10 but rather clearance is provided however, it is preferred that the distance between the magnet and the component is minimised so as to maximise the forces of attraction. Alternatively, a magnet 30 may be provided in the cavity provided between the reference sides 10B and 10C and a lower edge 13A of component 12, in other words, in the corner between the component and the channel. Ideally, the magnet is not contiguous with the component but rather clearance is provided. The uppermost face or working face of the magnet is shaped to match the curvature of component 12 or is at least at an angle of 45° as illustrated by the dotted lines in FIG. 3. The magnet may extend along the entire length of channel 10 or may be provided discretely in regions where a component is likely to be mounted.

Figure 4:
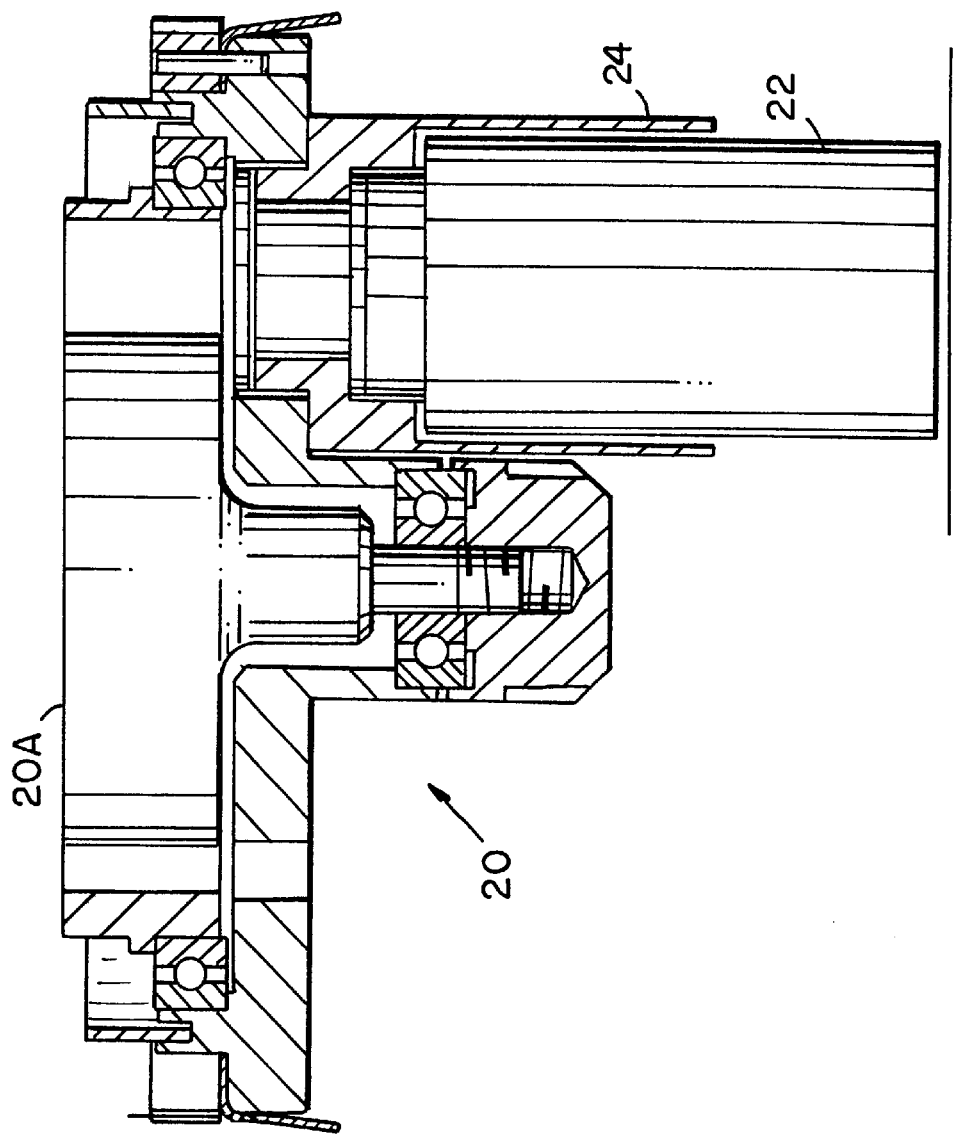
FIG. 4 represents a cross-section along the line B—B shown in FIG. 2.

Referring now to FIG. 4 there is shown a cross-section along the line B—B of FIG. 2 and there is thus shown a turret to which a number of objective lenses can be attached. The turret is mounted to the underside of the optical instrument and also immediately above the image plane. More specifically, the turret is referenced against planar surface 5 of the housing which surface 5 is perpendicular to the longitudinal axis of channel 1 and in a plane parallel to the longitudinal axis of channel 2. The turret is referenced against surface 5 as hereinafter described. The turret is circular in plan and is provided with a number of spaced apertures which are sized and shaped so as to either frictionally hold or screw-threadedly hold a plurality of selected objective lenses.

As previously mentioned, conventional microscopes are provided with turrets that are mounted at an angle of, for example 19°. This is so that the objective lenses can be rotated without fear of damaging an object to be viewed.

In the present invention the turret is mounted flat on the microscope and therefore the possibility of damaging an object to be viewed is overcome by providing the following arrangement. Selected objective lenses, that is low power objective lenses are provided within extension pieces 24 comprising downwardly extending tubular, shouldered extension pieces. Mounting of low power objective lenses in an extension piece is undertaken so that the focal point of a low power objective lens is below that of a corresponding high power objective lens. This means that focusing is achieved by moving an object away from the turret. In this way one safeguards against damage to an object to be viewed. When the reverse manipulation is required, and thus one moves from a low power objective lens to a high power objective lens, the object is moved towards the turret to an upper maximum point where the object will be in focus but impact with a high power objective lens will be avoided.

The relative movement between the object and each lens is under automatic control so that as one moves between lenses there will be relative movement of the object either away from or towards each relevant lens.

FIG. 4 clearly shows that in contrast to prior art arrangements, the rearward face 20A of turret 20 is flat, in other words it is not machined so as to be offset by, for example, an angle of 19°. Moreover, the rearward face 20A of turret 20 is referenced against planar surface 5 and positioned such that the optical axis of the system is ensured. In other words, the alignment of the turret with respect to a planar surface 5 enables the optical axis of the system to be aligned with the centre of the objective lens.

In view of the difference in working distance between high and low magnification lenses, ie it is known that a high power lens has a small working distance, and a low power lens has a large working distance, this arrangement of the turret with respect to the housing is provided in conjunction with an automatic working distance adjustment means. Thus, when switching from a low power to a high power lens the image plane will automatically be moved, relative to the lens, so avoiding contact with the image plate.

It will therefore be apparent from the above that the invention provides a housing which includes at least one, and preferably a plurality of channel means which are ideally arranged to intersect in a way that provides for a physical map of the path of travel of at least one beam of light so that optical components can be precisely positioned within said channel means along at least one common optical axis.

What is claimed is:

1. A housing for an optical instrument which housing is provided with an inner surface providing at a plurality of channel means extending there across at least two of which are arranged to join or interesect, each channel means having, in lateral section, at least two of at least partially planar sides thereof each having two longitudinal edges, of which one longitudinal edge of each side is common, and the other longitudinal edge of one side adjoins the inner surface, and the other longitudinal edge of the other side is remote from the inner surface, wherein the two sides are positioned at right angles with respect to each other so as to provide two reference surfaces against which a plurality of optical components can be positioned and wherein the longitudinal edge of each channel means remote from the inner surface is continuous with the corresponding longitudinal edge of the at least one other channel means, such that a common optical axis is provided when a number of optical components are positioned within each of said channels.

2. A housing according to claim 1 wherein said channel means defines a square or rectangular slot.

3. A housing according to claim 1, comprising a plurality of channel means at least two of which are arranged to join or intersect.

4. A housing according to claim 1, wherein said housing is provided with a turret comprising a reference surface for mating with said housing, which reference surface is perpendicular to the optical axis of the turret.

5. A housing according to claim 1, wherein said channel means is provided with magnetic means adapted to hold said components in said channel means.

6. A housing according to claim 5, wherein a recess is provided in at least one side of said channel means and a magnet is positioned therein so as to fit under flush with the uppermost edges of said recess.

7. A housing according to claim 5, wherein a magnet is provided in or towards a corner of said channel means where said two sides meet.

8. A housing according to claim 7, wherein said magnet is shaped to match or resemble at least a part of a component to be held in said channel means.

9. A housing according to claim 1, wherein said channel means is provided with screw or bolt receiving means whereby said components can be held within said channel means using a screw or bolt.

10. A housing according to claim 1, which is further provided with a turret receiving surface which is parallel with, or perpendicular to, at least one other surface of said housing or at least one channel means provided in said housing.

11. A housing according to claim 1 or 4, wherein said housing is provided with a turret comprising a reference surface for mating with said housing, which reference surface is perpendicular to the optical axis of the turret.

12. A housing according to claim 11, which is provided with at least one extension piece adapted to receive a low power objective lens in such a manner that when said lens is mounted therein the focal point of said low power objection lens is below that of a corresponding high power objective length.

* * * * *